9/13/77 XR 4,048,493

United States Patent [19]

Lee

[11] 4,048,493

[45] Sept. 13, 1977

[54] LIGHT-SENSITIVE CONTROL FOR COLORED LIGHT PROJECTOR

[75] Inventor: Jerald Dana Lee, Mendenhall, Pa.

[73] Assignee: E. I. Du Pont de Nemours and Company, Wilmington, Del.

[21] Appl. No.: 711,407

[22] Filed: Aug. 3, 1976

[51] Int. Cl.[2] .......... G01J 1/32

[52] U.S. Cl. .......... 250/205; 250/226; 240/3.1; 350/269

[58] Field of Search .......... 240/3.1, 46.59; 250/209, 226, 239, 205; 350/269; 356/96, 98

[56] References Cited

U.S. PATENT DOCUMENTS

| | | | |
|---|---|---|---|
| 3,805,065 | 4/1974 | Williams | 250/226 |
| 3,876,878 | 4/1975 | Frank et al. | 250/205 |
| 3,924,121 | 12/1975 | Barbieri | 250/205 |

*Primary Examiner*—David C. Nelms

[57] ABSTRACT

A device for producing variable colors from projected white light and quantifying the color changes resulting therefrom is provided which is useful in color-styling designs and color shade matching. The device comprises (1) an adjustable color filter having at least two primary-color areas upon which a portion of said projected white light is incident, (2) light-attenuation means which attenuates the quantity of light transmitted from (by attenuating either the incident white light or transmitted color light) each of the primary-color areas as well as the portion of the projected light which is transmitted unfiltered, and (3) control means comprising (a) a light-measuring unit for measuring the transmitted light and generating a signal proportional to the amount of light measured, (b) means responsive to said signal to determine the quantity of each component of transmitted light present and (c) means responsive to (b) for controlling each of the light-attenuation means.

A particularly preferred and useful embodiment involves a multiplicity of such devices arranged such that the portion of a common design imaged by each device is in registration at a common plane, with every other portion of the design imaged by the other devices.

31 Claims, 5 Drawing Figures

(X,Y) CIE CHROMATICITY DIAGRAM

LIGHT-SENSITIVE CONTROL FOR COLORED LIGHT PROJECTOR

BACKGROUND OF THE INVENTION

1. Field of the Invention

This invention relates to color-controllable optical devices and more particularly to optical, color-styling devices.

2. Prior Art

It is known in the art to construct colored images in a controllable or repeatable manner by giving the operator means to measure the properties of the light being used. For example, in U.S. Pat. No. 3,945,731, issued Mar. 23, 1976, to Michael Graser, Jr., an optical display apparatus is described for producing a colored design by adjusting different zones of a diffraction grating and measuring and controlling the intensity of each contributing spectral component. Three detectors are used for color measuring, and light-attenuation control is achieved through the use of rotatable neutraldensity wedges interposed in the color-light beams. While such a display apparatus is useful in color-styling, the use of a diffraction grating and fiber optics results in a loss of flux which reduces image brightness if ordinary tungsten lamps are used. Also, diffraction gratings are costly and the preparation of such gratings for every desired design can be expensive. It is desirable to have a color-styling apparatus that does not have costly or imperfect optical and control systems and which is light in weight and small in size in order to be portable.

U.S. Pat. No. 3,782,815, issued Jan. 1, 1974, to Raymond E. Kittredge describes a visual display system wherein a single projected color, representing a fill-in portion of a sky scene contained in a transparency is capable of being varied through a range of shading to match a reference sky color contained in a film frame. This system only varies a single color and would not find use in color-styling a design where colors are varied over the complete color range for each selected portion of the design.

A commercially available multiple projection color simulator is the Teijin Color Simulator available from the Japan Color Institute. Results obtained with this simulator are unsatisfactory due to its bulk and overall operating complexities. Also, the Teijin Simulator has no provision for quantification of the viewed color changes since it has neither a detector nor any electronic memory provision for implementation of color control.

SUMMARY OF THE INVENTION

According to the present invention there is provided a device for producing variable colors from projected white light comprising (1) an adjustable color filter having at least two primary-color areas upon which a portion of said projected white light is incident, (2) individually actuatable light-attenuation means which attenuates the quantity of light transmitted from each of the primary color areas as well as the portion of the projected light which is transmitted unfiltered, and (3) control means comprising (a) a light-measuring unit for measuring the transmitted light and generating a signal proportional to the amount of light measured, (b) means responsive to said signal to determine the quantity of each component of transmitted light present and (c) means responsive to (b) for controlling each of the light-attenuation means.

According to a preferred embodiment, a transparency of a design is positioned in the device to receive and transmit the transmitted light and masked so as to image a portion of the design in the color of the transmitted light.

In an especially preferred embodiment, a multiplicity of the aforesaid devices are arranged to image separately the portion of a composite design transmitted by the masked transparencies of all of the devices in registration at a common plane. The number of devices so arranged is in accordance with the number of different colors desired to be varied in the composite design.

DETAILED DESCRIPTION OF THE INVENTION

Figure 1:
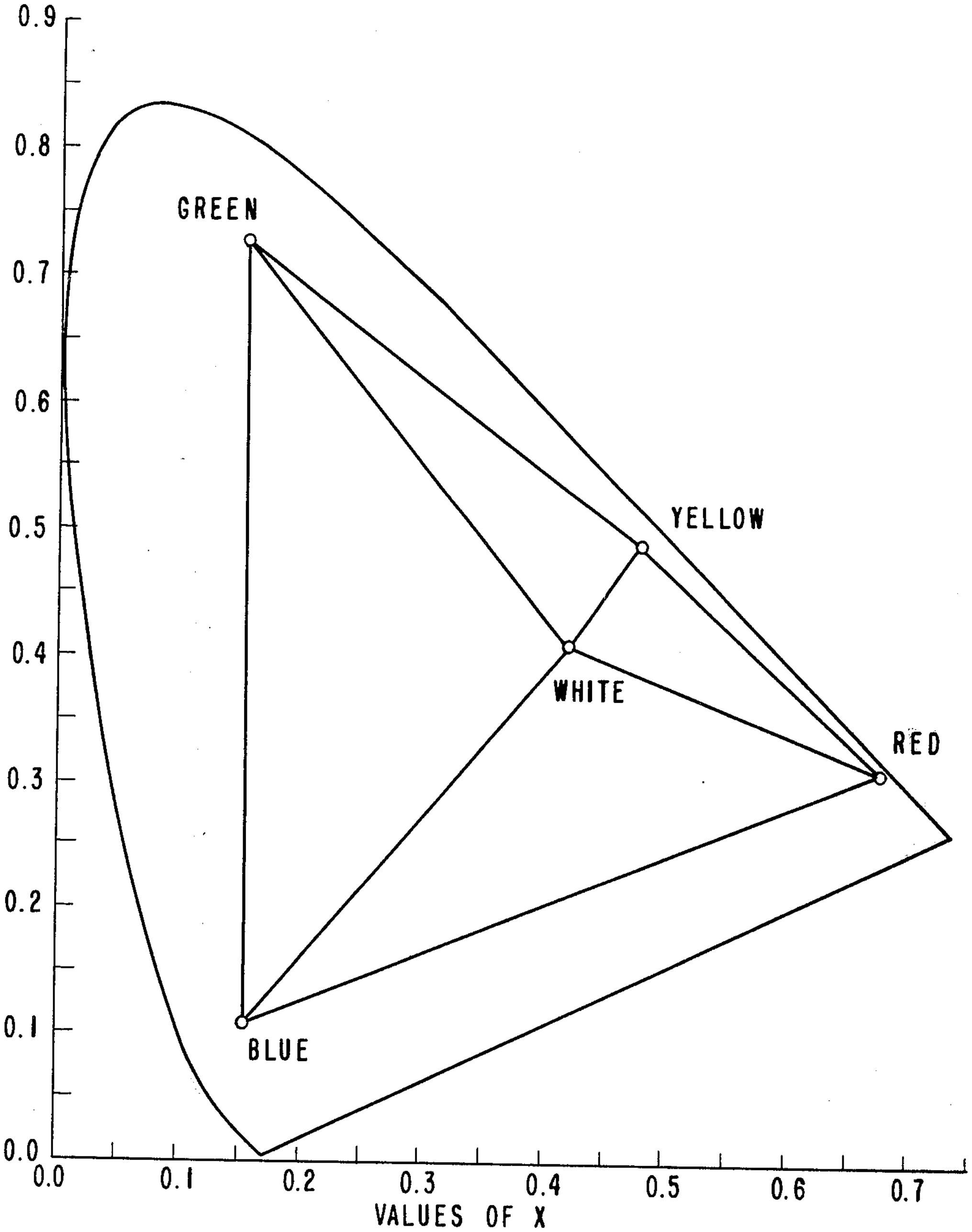
FIG. 1 is a graph of the C.I.E. chromaticity diagram illustrating the approximate coordinates of the four primary and white colors found useful in the present invention (the C.I.E. color system is described in detail in the "Handbook of Colorimetry" by Arthur C. Hardy, The Technology Press, Massachusetts Institute of Technology, 1936)

With reference to FIG. 1 there is shown the C.I.E. chromaticity diagram with the five dots representing the approximate *x, y,* color coordinates for four saturated primaries and white found useful in the present invention. The quadrilateral with the primaries located at its vertices represents the chromaticity range obtainable by additive mixture. As can be seen, the quadrilateral is composed of four triangular areas-each area corresponding to a color range resulting from the mixture of two saturated primaries and white light. By rotation of the color filter wheel (described later), the desired primary pairs can be positioned in a projected white light path to permit generation of color within the triangular area of interest. The four primaries must be in the order of red, blue, green and yellow for use in the color filter, since the combinations of yellow and blue, and red and green cannot be used. The four saturated primaries shown are a practical compromise between good color and brightness, and produce a larger color range than can be obtained with a conventional three-primary system. To produce the maximum brightness in saturated colors, only two of the contiguous primaries are used. To produce unsaturated colors, white light is added to the two primaries. More saturated primaries than those illustrated can be used, but at a sacrifice in brightness.

Figure 2:
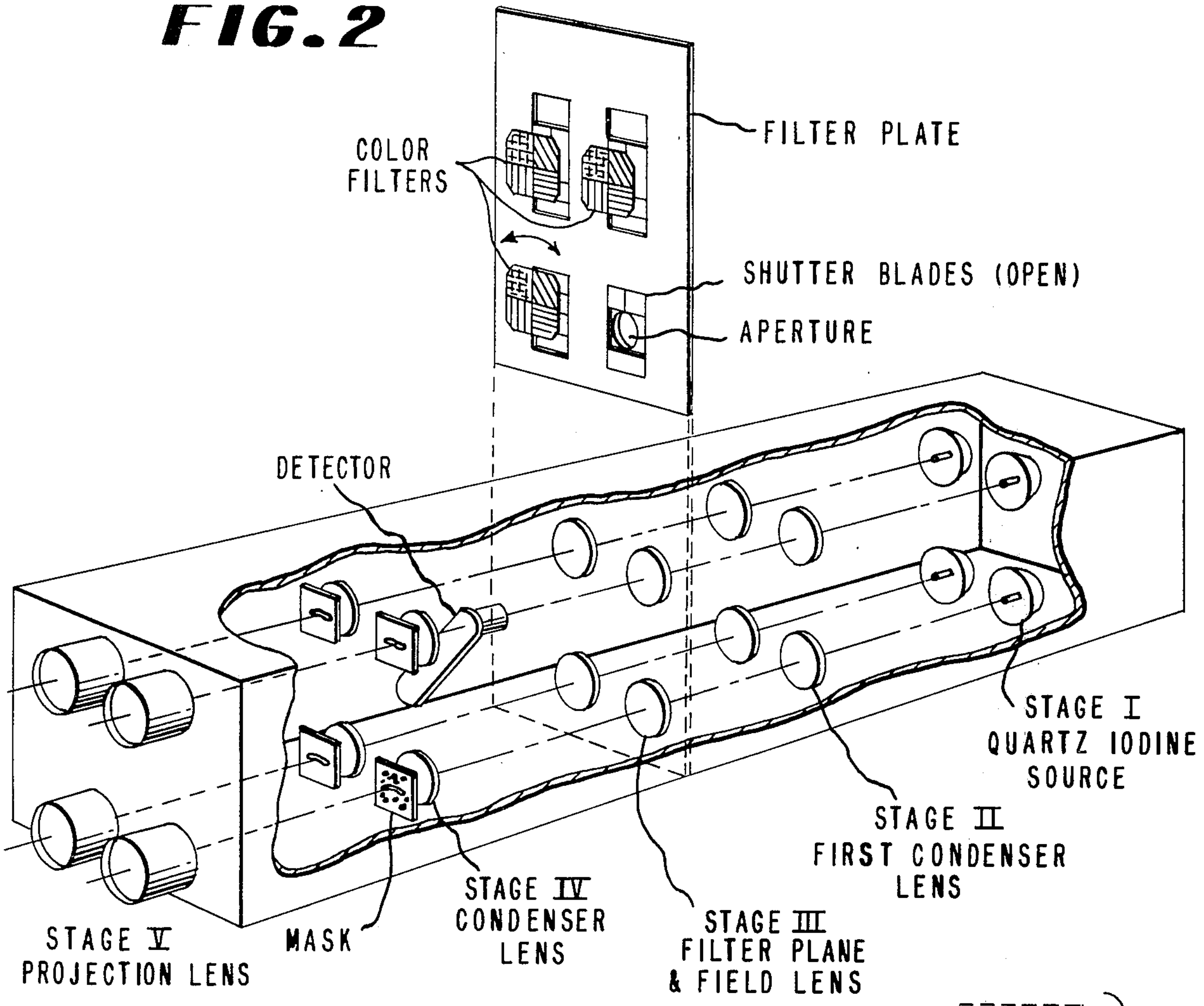
FIG. 2 is a schematic, perspective illustration of a four-device color-styling projector of the invention.

In FIG. 2 is schematically illustrated a portable four-device color-styling projector which measures 8 inches high by 6 inches wide and 30 inches long. The servo control system is not shown. As shown, each device comprises an ELH 300 watt lamp at stage I with reflector as the projected white light source. Stage II is a condenser lens which for the illustrated embodiment is a pair of 49 mm diameter by 127 mm f.l. plane convex lenses. Stage III is a field lens of 31 mm diameter by 63 mm f.l. double convex lenses with a dichroic or absorption adjustable color filter, having a constant spectral distribution for each primary, and shutter mechanism (shown more fully in FIG. 3) positioned just before the field lens. Stage IV is the same condenser lens as at stage II plus a 4 inches × 5 inches photographic plate containing the projection transparency masks of a design positioned just after the condenser lens. A detector for measuring the light transmitted through the color filter and field lens is positioned just before the stage IV condenser lens. It is rotatable so that the one detector can be used for all four devices. Apparatus of the prior art capable of measuring tristimulus coefficients ordinarily comprises three appropriately filtered detector photoelectric cells. Such apparatus is sensitive to mutual interference between colors, as well as to the relative locations of the light source and the photocells.

Stage V is a projection lens which images the portion of the design in the mask on a projection screen. The projection lens is a Wollensak 5 inches f/3.5 anastigmat projection lens.

The four devices shown are spaced 2.25 inches between centers horizontally and 2.5 inches between centers vertically. Even this close spacing permits the insertion of the adjustable dichroic color filter and shutter mechanism at stage III. While four devices are illustrated, any convenient multiple of devices can be used.

Figure 3:
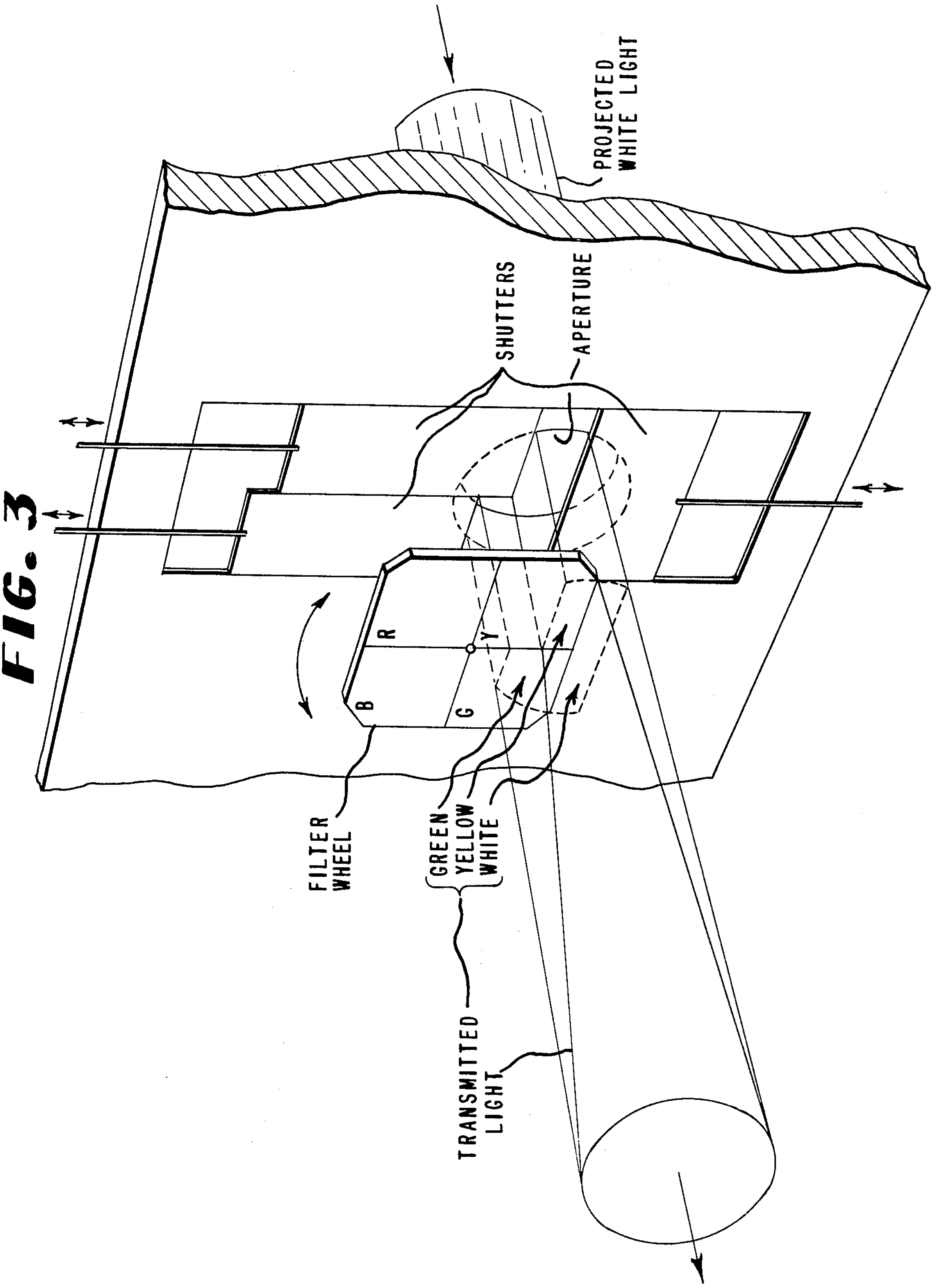
FIG. 3 is an illustrative, perspective view showing an adjustable color filter and shutter mechanism of the invention.

In FIG. 3, projected white light from stage I is directed at an aperture contained in the shutter mechanism plate. The stage II condenser lens images the projected light so that the diameter of the aperture is substantially the same as the projected light image. Three servo-controlled shutter blades are positioned so that each covers a portion of the aperture. The illustrated lower shutter covers up to one-half of the aperture and controls the amount of projected white light passing through the aperture. The white light controlled by this shutter is not transmitted through the adjustable color filter. The two illustrated upper shutters control the amount of projected white light incident on two contiguous primary color areas of the adjustable color filters--in the illustrated case, green and yellow. The shutters may also be positioned after the color filter so as to attenuate the transmitted color light. Each of the upper shutters covers up to about one-quarter of the aperture. The color filter has four primary color quadrants in the order red, blue, green and yellow corresponding to colors shown on the chromaticity diagram, is perpendicular controlled and is rotatable about an axis perpedicular to the plane of the aperture. Alignment of the color filter with the aperture is such that a portion of the projected white light is transmitted from each of two contiguous filters as appropriate filtered, color components plus the white-light transmission, e.g., the axis of the color filter at the intersection of the four primary-color quadrants intersects the shutter mechanism plate at a point located at the top edge of the aperture.

Since the adjustable color filter in each device is small in size, each device can have each filter segment cut from a single larger filter and have essentially matched characteristics. By closely grouping a multiplicity of such devices, it is easy to use a single photodetector to monitor the intensity of each primary color, and the white, for each device sequentially, The control system shown in FIG. 4 can either be used in a reverse mode (Case I), i.e., from a displayed transmitted color the corresponding C.I.E. tristimulus values for that color can be determined, or in a forward mode, (Case II), i.e., a color can be displayed based on its tristimulus values. C.I.E. tristimulus values for a given displayed color can be obtained by matrix transformation from the detector voltages for each of its components. Appropriate corresponding values of reference voltages can be generated and used as the set points for the servo motors controlling the three shutter blades in each device.

Since each of the projector devices is identical regarding color control, a single device need only be considered. As stated earlier, color is obtained in each device by the additive mixture of two saturated primaries and white. The saturated primaries can be any pair from a choice of four. To simplify this teaching, it is assumed that a simulated color is obtained from the addition of red, blue, and white light; although another color corresponding to a different combination of primaries can just as easily be used.

Case I

Given a color image on a screen and the detector voltages $V_R$, $V_B$, and $V_W$, what are the corresponding tristimulus values?

The detector voltages are electronically adjusted to have maximum values of 1 volt, which corresponds to maximum values of fluxes. Thus, the detector voltages are identical with the fraction of full flux output for each primary (white included).

Let the tristimulus values of the full output of the red filter be $X_R$, $Y_R$, and $Z_R$. Similarly, let the tristimulus values of the full outputs of the blue and white filters be $X_B$, $Y_B$, $Z_B$, and $X_W$, $Y_W$, $Z_W$ respectively. The experimental measurement of these nine values will be discussed later.

For less than full output, the tristimulus values of the red filter are $V_{RXR}$, $V_RY_R$, and $V_RZ_R$, since $V_R$ represents voltage or fraction of full output. Similarly, the tristimulus values for less than full output of the blue and white filters are $V_BX_B$, $V_BY_B$, $V_BZ_B$, and $V_WX_W$, $V_WY_W$, $V_{WZW}$, respectively.

By the principle of additivity of tristimulus values, the X tristimulus value of the displayed color ($X_D$) is the sum of the tristimulus values from each primary.

$$X_D = V_RX_R + V_BX_B + V_WX_W \tag{1}$$

The Y and Z tristimulus values ($Y_D$, $Z_D$) of the displayed color are similarly given:

$$Y_D = V_RY_R + V_BY_B + V_WY_W \tag{1}$$

$$Z_D = V_RZ_R + V_BZ_B + V_WZ_W. \tag{1}$$

The question of Case I has been answered, except for describing how $X_R$, $X_B$, $X_W$, $Y_R$, $Y_B$, $Y_W$, $Z_R$, $Z_B$, $Z_W$ are determined.

It is customary to normalize Y (and X, Z proportionally) so that the Y value of a white object in the surround(S) is 100, i.e., $$Y_S = \beta \int \bar{y}_\lambda S_\lambda d\lambda = 100$$

$S_\lambda$ is the spectral distribution of the white object in the surround, $\beta$ is the normalizing factor necessary to obtain a value of 100, and $\bar{y}_\lambda$ is the C.I.E. weighting function for determining the Y tristimulus value.

The nine tristimulus values are determined from experimentally measured spectral distributions. Let the spectral distributions of the light from the red filter be designated by $R_\lambda$ and for the blue and white filter by $B_\lambda$ and $W_\lambda$ respectively.

The full-output, tristimulus values for the three filters are then $$X_R = \beta \int \bar{x}_\lambda R_\lambda d\lambda$$
$$Y_R = \beta \int \bar{y}_\lambda R_\lambda d\lambda$$
$$Z_R = \beta \int \bar{z}_\lambda R_\lambda d\lambda$$
$$X_B = \beta \int \bar{x}_\lambda B_\lambda d\lambda$$
$$Y_B = \beta \int \bar{y}_\lambda B_\lambda d\lambda$$
$$Z_B = \beta \int \bar{z}_\lambda B_\lambda d\lambda$$
$$X_W = \beta \int \bar{x}_\lambda W_\lambda d\lambda$$
$$Y_W = \beta \int \bar{y}_\lambda W_\lambda d\lambda$$
$$Z_W = \beta \int \bar{z}_\lambda W_\lambda d\lambda$$

Case II

Given C.I.E. tristimulus values $X_D$, $Y_D$, $Z_D$, what are the detector voltages necessary to display this color on the screen?

Assuming for simplicity that the color can again be obtained by using a mixture of red, blue, and white light, equations (1) are used, which are repeated below:

$$X_D = V_R X_R + V_B X_B + V_W X_W$$
$$Y_D = V_R Y_R + V_B Y_B + V_W Y_W$$
$$Z_D = V_R Z_R + V_b Z_b + V_W Z_W$$

This is a set of 3 simultaneous equations with three unknowns, $V_R$, $V_B$, and $V_W$. The solutions for these voltages are presented to the projector and the corresponding color display obtained. The voltages presented to the projector can be generated by computer output.

Figure 4:
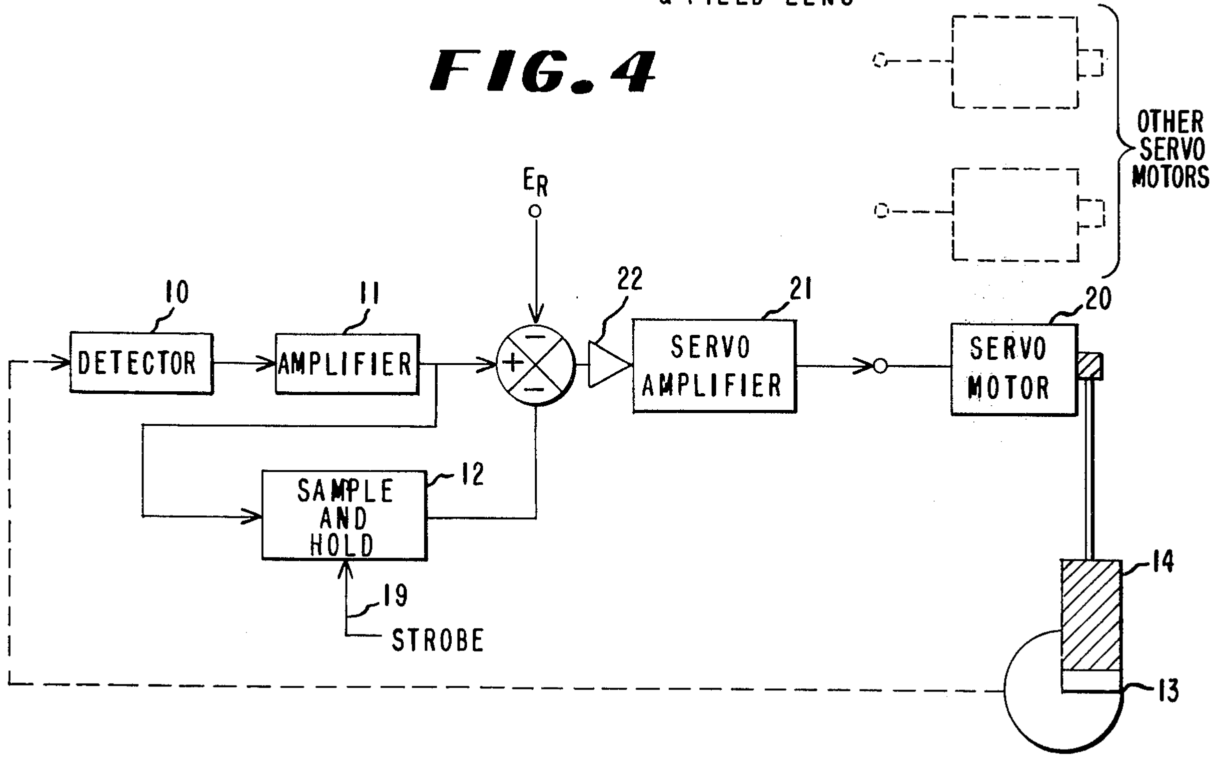
FIG. 4 shows partially in block diagram form, a color control system particularly preferred in the present invention.

Referring now to FIG. 4, there is shown a lightcontrolled servo system that obtains its control signals from a sample-and-hold system 12, which serves as a memory for separating out the quantitative information on the various color components of the transmitted light. Optical signals are provided simultaneously from each aperture portion 13, depending on the respective position of each servo-adjusted shutter blade 14, and are fed back (dashed line, FIG. 4) to the detector 10 and to the sample-and-hold system 12, via amplifier 11 until the sum of the detector output, the reference voltage, and the sample-and-hold output, is zero and the shutter reaches its final position. This successive corrective action occurs in an entirely linear manner, despite the non-linearity that exists between successive positions of the shutter blade and the light transmitted by the unblocked aperture portion.

Figure 5:
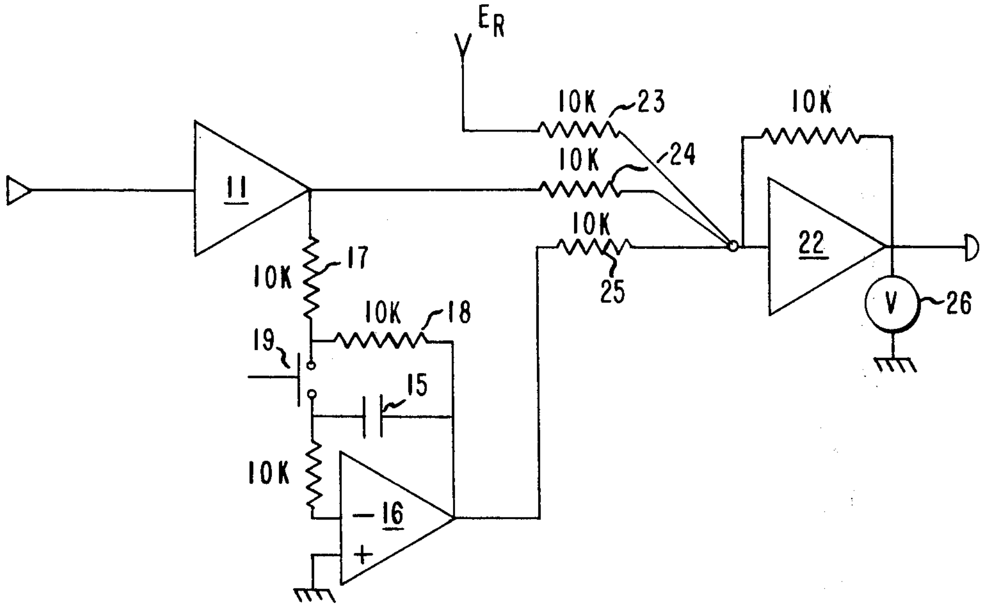
FIG. 5 shows the details of the sample and hold blocks shown in FIG. 4.

Referring now to FIG. 5, detailing sample-and-hold block 12 and the associated summation circuitry; sample-and- hold systems generally employ a capacitive storage element 15 in combination with at least one amplifier 16, an input resistor 17 and a feedback resistor 18. Upon actuation of the strobe 19, the capacitor 15 is charged to a value proportional to the input signal during the sample period, and the amplifier input is then disconnected from the input 17 when the hold mode is initiated. The charge stored in capacitor 15 is then maintained for the duration of the hold interval, subject to normal leakage; thus, the memory function is served. In this case, the amplifier 16 is an inverting amplifier in order that it can perform a subtractive operation. A signal is thus provided to servo motor 20 (FIG. 4) via servo amplifier 21, depending upon the output of unity-gain current-summing amplifier 22 (FIG. 5). The input to amplifier 22 is provided by the three resistors 23, 24, 25. The reference voltage is provided on 23; the detector output (e.g., that attributable to the yellow plus red plus white components) is provided on 24, and the sample-and-hold subtractive voltage, representative of the color previously adjusted, on 25. In the forward mode, the measured voltage output, representative of the desired tristimulus value, is provided at the output 26 of amplifier 22 to servo-amplifier 21. In the reverse mode, $E_R$ represents the desired tristimulus value.

In multiple-device operation, servo control (not shown) is applied whereby, for the setting of each device, the photodetector is moved into position for a specific device and the three reference voltage values are set to correspond to the desired intensity of each of the two color primaries and the white light. For example, starting with all three shutters closed (reverse mode), one is opened until the detector produces a signal voltage matching (nulling) the appropriate reference voltage. This nulling voltage is held in memory (sample and hold circuit) and subtracted from the detector signal as the next shutter blade is opened and the difference value nulled with the next reference. Similarly, the combined detector signal nulling voltage from this second setting is held in memory and subtracted from the detector signal as the third shutter is opened and this new difference value nulled with the last reference.

What is claimed is:

1. A device for producing variable colors from projected white light comprising (1) an adjustable color filter having at least two primary-color areas upon which a portion of said projected white light is incident, (2) individually actuatable light-attenuation means which attenuates the quantity of light transmitted from each of the primary-color areas as well as the portion of the projected light which is transmitted unfiltered, and (3) control means comprising (a) a lightmeasuring unit for measuring the transmitted light and generating a signal proportional to the amount of light measured, (b) means responsive to said signal to determine the quantity of each component of transmitted light present and (c) means responsive to (b) for controlling each of the light-attenuation means.

2. The device of claim 1 wherein the color filter contains for primary-color areas in the order of red, blue, green and yellow represented by corresponding primary-color points on the chromaticity diagram.

3. The device of claim 2 wherein the light-attenuation means are shutters contained in a shutter mechanism consisting essentially of a plate having an aperture therein for passing the projected light therethrough and individually controllable shutters for each of the primary-color areas and for the portion of projected light which is transmitted through the aperture unfiltered.

4. The device of claim 2 wherein the adjustable color filter is rotatable about an axis perpendicular to the light attenuation means.

5. The device of claim 3 wherein the means for controlling each of the light-attenuation means is a servo mechanism having a servo motor for each of said light attenuation means.

6. The device of claim 1 wherein a transparency of a design is positioned to receive and transmit the transmitted light and masked so as to image a portion of the design in the color of the transmitted light.

7. The device of claim 3 wherein a transparency of a design is positioned to receive and transmit the transmitted light and masked so as to image a portion of the design in the color of the transmitted light.

8. The device of claim 1 wherein a multiplicity of such devices are arranged to image the transmitted light of each device in registration at a common plane.

9. The device of claim 6 wherein a multiplicity of such devices are arranged to image the portion of the design transmitted by the mask of each device in registration at a common plane.

10. The device of claim 7 wherein a multiplicity of such devices are arranged to image the portion of the design transmitted by the mask of each device in registration at a common plane.

11. The device of claim 8 wherein the light-measuring unit of each device is a common unit adjustable to measure the transmitted light from each device.

12. The device of claim 9 wherein the light-measuring unit of each device is a common unit adjustable to measure the transmitted light from each device.

13. The device of claim 10 wherein the light-measuring unit of each device is a common unit adjustable to measure the transmitted light from each device.

14. A device for producing variable colors from projected white light comprising (1) an adjustable color filter having four contiguous primary-color areas, (2) a shutter mechanism consisting essentially of a plate having an aperture therein for passing the projected light therethrough and three individually controllable shutters, each movable over a portion of the aperture, said filter positioned near and aligned with the aperture in a manner such that the projected white light controllable by one shutter is not transmittable through said filter and the projected white light controllable by the remaining two shutters is incident on any two contiguous color areas, and (3) measurement and control means comprising (a) a light-measuring unit for measuring transmitted light and generating an electrical signal proportional to the amount of light measured, (b) means electrically connected to the light-measuring unit which measures said electrical signal and determines the quantity of each transmitted component of the light present and (c) a servo mechanism responsive to (b) for controlling each of the three shutters.

15. The device of claim 14 wherein the four primary-color areas are in the order of red, blue, green and yellow and the two contiguous color areas on which the projected light is incident are represented by two corresponding primary-color points on the chromaticity diagram.

16. The device of claim 15 wherein the first shutter is movable to cover up to about one-half of the aperture and each of the remaining two shutters is movable to cover up to about one-quarter of the apertures.

17. The device of claim 16 wherein the color filter is rotatable about an axis perpendicular to the plane of the aperture.

18. The device of claim 17 wherein the servo mechanism includes three servo motors, one for each of the three shutters.

19. The device of claim 18 wherein the aperture has a diameter substantially the same size as the projected light image.

20. The device of claim 14 wherein a transparency design is positioned to receive and transmit the transmitted light and masked so as to image a portion of the design in the color of the transmitted light.

21. The device of claim 18 wherein a transparency of a design is positioned to receive and transmit the transmitted light and masked so as to image a portion of the design in the color of the transmitted light.

22. The device of claim 14 wherein a multiplicity of such devices are arranged to image the transmitted light of each device in registration at a common plane.

23. The device of claim 20 wherein a multiplicity of such devices are arranged to image the portion of the design transmitted by the mask of each device in registration at a common plane.

24. The device of claim 21 wherein a multiplicity of such devices are arranged to image the portion of the design transmitted by the mask of each device in registration at a common plane.

25. The device of claim 22 wherein the light-measuring unit of each device is a common unit adjustable to measure the transmitted light from each device.

26. The device of claim 23 wehrein the light-measuring unit of each device is a common unit adjustable to measure the transmitted light from each device.

27. The device of claim 24 wherein the lightmeasuring unit of each device is a common unit adjustable to measure the transmitted light from each device.

28. A multiple projection color simulator comprising: at least two devices for producing variable colors from projected white light, each device comprising (a) a white light source, (b) an adjustable color filter having at least two primary-color areas, (c) a shutter mechanism consisting essentially of a plate having an aperture therein for passing the white light therethrough and three individually controllable shutters, each movable over a portion of the aperture, said filter positioned near and aligned with the aperture in a manner such that a portion of the white light passable through the aperture is not transmittable through said filter and is controllable by one shutter and the remaining white light passable through the aperture is incident on two of the primary-color areas and the remaining two shutters control the quantity of light transmittable from said two areas, and (d) a transparency of a design positioned to receive and transmit the light transmitted by the shutter mechanism and filter and masked so as to image a portion of the design in the color of the transmitted light, the transparency of each device being of a common design with a different portion masked, and arranged to image the portion of the design transmitted by the mask of each device in registration at a common plane.

29. The color simulator of claim 28 wherein the color filter is rotatable about an axis perpendicular to the plane of the aperture and has four contiguous primary-color areas in the order of red, blue, green and yellow and the two color areas on which the white light is incident are two contiguous areas represented by two corresponding primary-color points on the chromaticity diagram.

30. The color simulator of claim 29 wherein each device has means for controlling each of the three shutters.

31. The color simulator of claim 29 wherein the simulator has at least four devices for producing variable colors.

* * * * *